(12) United States Patent
Hasegawa et al.

(10) Patent No.: US 9,910,617 B2
(45) Date of Patent: Mar. 6, 2018

(54) DATA UPDATING IN A FILE SYSTEM

(71) Applicant: International Business Machines Corporation, Armonk, NY (US)

(72) Inventors: Tohru Hasegawa, Tokyo (JP); Hiroshi Itagaki, Yokohama (JP); Sosuke Matsui, Tokyo (JP); Shinsuke Mitsuma, Tokyo (JP); Tsuyoshi Miyamura, Yokohama (JP); Noriko Yamamoto, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 159 days.

(21) Appl. No.: 14/955,593

(22) Filed: Dec. 1, 2015

(65) Prior Publication Data

US 2017/0153840 A1 Jun. 1, 2017

(51) Int. Cl.
*G06F 3/06* (2006.01)
(52) U.S. Cl.
CPC .......... *G06F 3/0643* (2013.01); *G06F 3/0604* (2013.01); *G06F 3/0682* (2013.01)
(58) Field of Classification Search
CPC ...... G06F 3/061; G06F 3/0611; G06F 3/0643; G06F 3/0682; G06F 2003/0691; G06F 2003/0695; G06F 12/023; G06F 12/06; G06F 2206/1014; G06F 2212/1024; G06F 2212/213
See application file for complete search history.

(56) References Cited

U.S. PATENT DOCUMENTS

| | | | | |
|---|---|---|---|---|
| 7,672,980 B2 * | 3/2010 | Sano | ..................... | G06F 3/0613 707/999.204 |
| 2014/0164693 A1 | 6/2014 | Hasegawa et al. | | |
| 2015/0055442 A1 | 2/2015 | Katagiri et al. | | |
| 2015/0095566 A1 | 4/2015 | Itagaki et al. | | |
| 2015/0199132 A1 | 7/2015 | Fujihara et al. | | |

OTHER PUBLICATIONS

Pease, David et al., "The Linear Tape File System", IEEE, 2010 IEEE 26th Symposium on Mass Storage Systems and Technologies (MSST), Incline Village, NV, May 3-7, 2010, 8 pages.

* cited by examiner

*Primary Examiner* — Hal Schnee
(74) *Attorney, Agent, or Firm* — Francis Lammes; Stephen J. Walden, Jr.; Randall J. Bluestone

(57) ABSTRACT

A mechanism is provided for updating data of a file on a tape in a file system using a tape drive. Data of a file which received a write request is read out from a tape drive and stored in a memory. At least a part of the data of the file is edited and the edited data part of the file is stored in the memory. Combination data with a non-edited data part and the edited data part of the file is written on the tape in the tape drive as a continuous data of the file to have an extent. The extent of the written continuous data of the file is then written on the tape.

20 Claims, 5 Drawing Sheets

(a) FILE A (X1,Y1)

(b) FILE A (X1,Y1') (X3,Y3) (X2,Y2)

DATA UPDATING IN A FILE SYSTEM

BACKGROUND

The present invention relates to data updating in a file system, and more specifically, to a method of updating data of a file on a tape in a file system using a tape drive.

Linear Tape File System (LTFS) is a technique allowing data to be recorded in and read out from a tape loaded in a tape drive through a file system. LTFS allows a user to use the tape as large-capacity external recording media through similar operations performed on removable hard disks. LTFS offers a scheme for making an access to the data on the tape as a file by managing the meta-information of the file as an index.

The meta-information in the index includes the block number of the block in which the file is written, offset, file size, file name, and extended attribute information, etc. The following notation is used in the following explanations for simplicity:

File X (offset 1, size 1) (offset 2, size 2) . . .

This notation denotes that the File X is constituted of a section having the size 1 and written from the offset 1 and another section having the size 2 and written from the offset 2, where each portion "(offset, size)" is called "extent."

When programs of application modify any part of the file read from the file system (LTFS in this case), the programs only write the modified portion in the file system. LTFS features the scheme for fragmenting the modified section of the file and writing the fragmented section as another extent. FIG. 1 shows a configuration example of a conventional method of editing a file (updating data) by fragmentation in LTFS using a tape drive. Note that the tape drive is also known as a sequential device which is allowed to write data only after the last end of the data (EOD).

A certain section (data part) of the file A which has the extent (X1, Y1) as shown in FIG. 1(a) is edited and re-written. Specifically, the data of the file A having the size Y1 and written starting from the offset X1 is edited (modified). In the result, the new file A is obtained as shown in FIG. 1(b). The data 1 having the size Y1' and written starting from the offset X1, the data 2 having the size Y3 and written starting from the offset X3, and the data 3 having the size Y2 and written starting from the offset X2 constitute the new file A. The new file A has three fragmented data 1, 2, 3 and becomes to have the extent (X1, Y1') (X3, Y3) (X2, Y2) corresponding to each data. It will be appreciated that the capacity used on the tape is reduced relative to a case where the entire file is re-written.

Meanwhile, there is a problem when this file A is read. That is, movement on the tape increases as illustrated in FIG. 2, which causes the operation to be slowed down. In FIG. 2, when the file A is read out, seek time (seek_1, seek_2, seek_3) for seeking the subsequent data position (X1, X3, X2) occurs, which has a large influence on the read performance. Specially, in the seek operation, movement on the tape of about 1000 m takes place with speed of 12.4 m/sec, so that the movement from one end to the other end of the tape takes about 80 seconds, and the movement from any position to another position takes about 27 seconds on average. Hence, occurrence of one more dashed arrow in FIG. 2 causes additional seek time in the order of 27 seconds.

In the course of file update as illustrated in FIG. 1, the time required for reading one file becomes prolonged in proportion to the frequency of file updates. Therefore, it is necessary to shorten time of the readout of the updated file in the file system using the tape drive.

SUMMARY OF THE INVENTION

The present invention provides a method of updating data of the file on the tape in the file system and a storage system for managing files using the file system.

In one aspect of the present invention, a method of updating data of a file on a tape in a file system using a tape drive comprises (a) responsive to receiving a update request for a file on a tape, reading data of the file on the tape on the tape drive and storing the data in a memory, (b) editing at least a part of the data of the file and storing the edited data part of the file in the memory, (c) writing combination data with a non-edited data part and the edited data part of the file on the tape in the tape drive as a continuous data of the file to have an extent, and (d) writing the extent of the written continuous data of the file on the tape.

In another aspect of the present invention, a storage system for managing files using a file system comprising a host and at least one tape drive which is able to communicate with the host is provided. In the storage system, the host executes the file system to perform the steps of (a) reading data of a file which received a write request, from a tape drive, and storing the data in a memory, and (b) editing at least a part of the data of the file and storing the edited data part of the file in the memory. Further, the tape drive performs the steps of (c) writing combination data with non-editing data part and the edited data part of the file on the tape in the tape drive as a continuous data of the file to have an extent, and (d) writing the extent of the written continuous data of the file on the tape.

In another aspect of the present invention, a computer program product for managing files in a file system using at least one tape drive is provided. The computer program product comprises a computer readable storage medium having program instructions embodied therewith. The program instructions are executed by a computer to cause the computer to perform a method comprising (a) reading data of a file which received a write request, from a tape drive, and storing the data in a memory, (b) editing at least a part of the data of the file and storing the edited data part of the file in the memory, (c) writing combination data with non-editing data part and the edited data part of the file on the tape in the tape drive as a continuous data, of the file to have an extent, and (d) writing the extent of the written continuous data of the file on the tape.

BRIEF DESCRIPTION OF THE DRAWING

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 3:
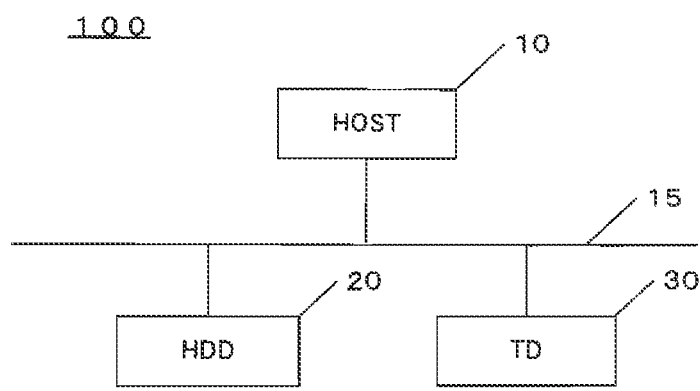
FIG. 3 is a diagram showing a configuration example of a storage system which performs a file system of one embodiment of the present invention.

The following is an explanation of one embodiment of the present invention with reference to the drawings. FIG. 3 is a diagram showing a configuration example of a system/storage system which performs a file system of one embodiment of the present invention. The system 100 includes a host 10, a hard disk drive (HDD) 20, and a tape drive (TD) 30 which can communicate mutually through a network 15. Each of the host 10, HDD 20 and TD 30 can include at least one or more.

The host 10 can include computers, such as a server or a personal computer (PC). HDD 20 may be a type built in the host 10. Moreover, other storage devices such as a semiconductor memory (SSD etc.) can be used instead of HDD 20. TD 30 can include a single type or a set type TD like a tape library. The system 100 can include HSM (hierarchical storage management) system. Especially, the system may be like RAID1 whose one of HDDs is replaced with TD.

The host 10 mounts/executes a file system used in the present invention. The file system can include LTFS, for example. LTFS can carry out direct access to the files stored in the tape cartridge like HDD, a USB memory, or other removable recording medium such as CD-R, if the tape cartridge is inserted in TD. The following explains the example using LTFS as a file system. Of course, other file systems can be used to perform embodiments of the present invention, Next, a tape used by a tape drive (for example, TD 30 of FIG. 3) of one embodiment of the present invention is explained. A tape used by a tape drive has a margin in the order of several percent of the official nominal capacity. This is in order to ensure that the capacity has a predetermined margin so as to respond to occurrence of re-writing due to an undesirable condition of the drive, the tape, and the like.

Figure 4:
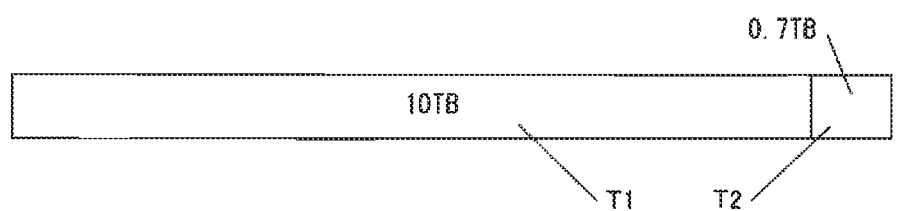
FIG. 4 is a diagram showing a configuration example of a nominal capacity of a tape and its margin.

FIG. 4 is a diagram showing a configuration example of a nominal capacity of a tape and its margin. In FIG. 4, the nominal capacity T1 of the tape is officially 10 TB, but actually the presence of a margin T2 of 0.7 TB (700 GB) ensures that 10 TB of data corresponding to this official nominal capacity can be fully written by virtue of the presence of the margin even when any tape drive or tape is not functioning well. Since data is not written in a tape beyond its nominal capacity T1, there exists an unused area while writing of the data is performed with a normal drive or a tape. The embodiment of the present invention proposes the method of re-writing/editing data on a tape using the unused area (margin T2).

In order to use the unused area (T2 in FIG. 4) effectively, the embodiment of the present invention defines the following seven variables for the tape and the tape drive.
1. Nominal capacity (Cn): Tape capacity that is officially made public.
2. Capacity margin (Cm): Tape capacity of the margin provided in preparation for undesirable writing performance.
3. Lost capacity (Cl): Tape capacity that has to be additionally used on the tape as a result of writing the modified file as one extent when compared with a case where the modified file to be written is fragmented.
4. Delta lost capacity (ΔCl): Difference of Lost capacity (Cl) that is generated by one time of editing the file.
5. Excessive capacity (Cx): Remaining tape capacity of the capacity margin when writing of data is performed until the nominal capacity is fully used, where the condition of the tape drive and the lost capacity at that point are taken into account to identify the remaining capacity.
6. Acceptable capacity (Ca): Predefined acceptable lost capacity. The tape drive allows reducing the actual writable capacity down to this level.
7. Tape Drive's write performance (Prw): Average of the proportion of the area used in a case where re-writing occurs in the writing of data with respect to that used in a case where the re-writing does not occur.

According to the method/system of the present invention, the file system (LTFS) performs to let the tape drive sequentially write data of files to the tape based on the following method when a file is updated/edited.

<Embodiment 1>

Figure 5:
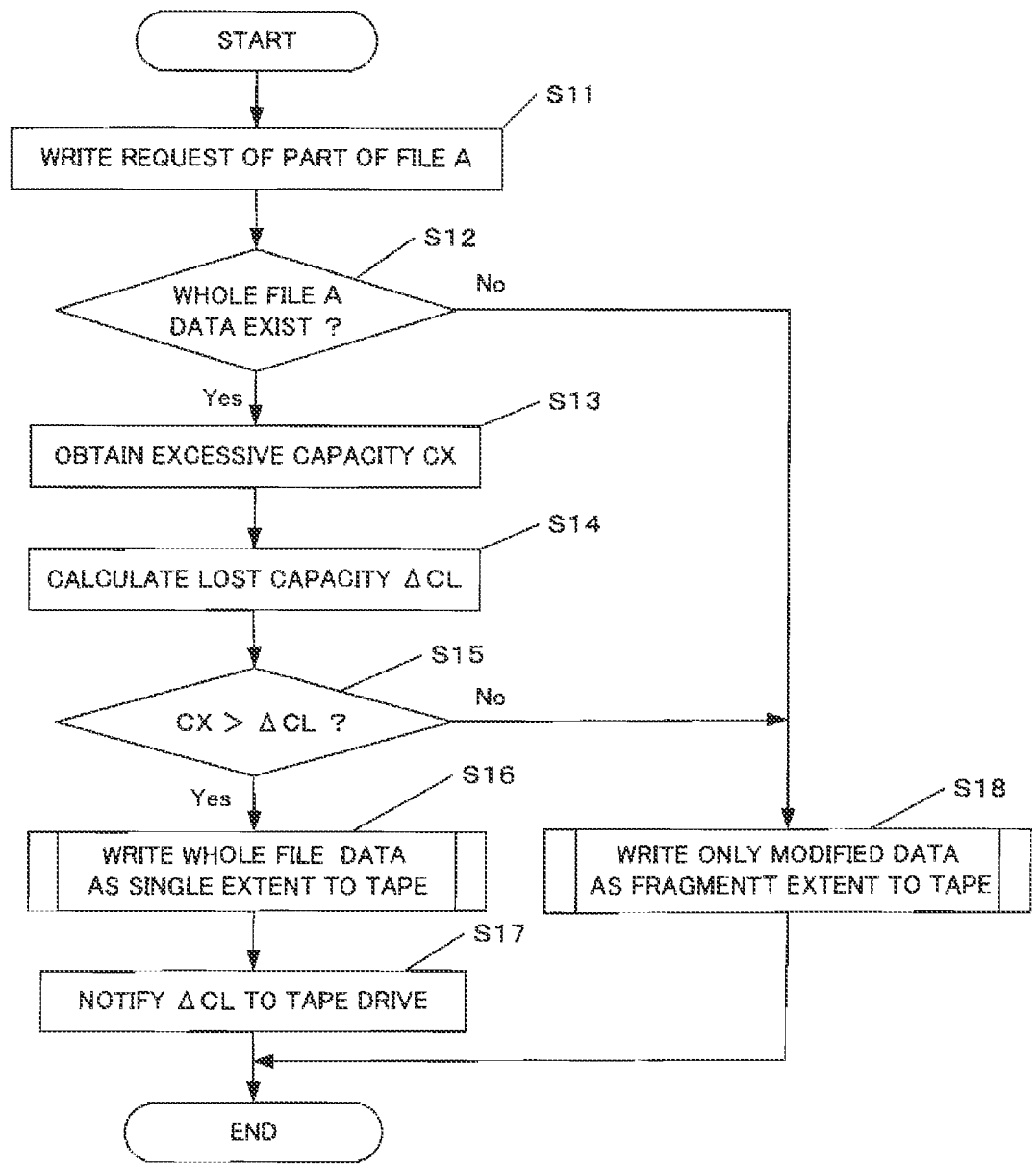
FIG. 5 is a chart showing a flow of a method of one embodiment of the present invention.

FIG. 5 is a chart showing a flow of a method of one embodiment of the present invention. The flow of FIG. 5 is performed by LTFS in storage system 100 of FIG. 3, for example. The execution of the flow is performed using the predetermined software which can be used and hardware in the storage system 100 of FIG. 3. The software which has program instructions can be embodied in a computer program product comprising a computer readable storage medium. The program instructions can be executed by a computer such as the Host 10 shown in FIG. 3 after the program instructions has been read out from the computer readable storage medium.

As the process begins, in step S11 of FIG. 5, LTFS receives a write request of a part of file (for example, file A) as a system call. In the specification, the term "write request of a part of file" is used the same meaning as term "edit", "update" or "modify". In step S12, it is judged whether the whole data including modified data of the file A has been stored (cached) in a memory (buffer) or not. If the judgment result is No, in step S18, the modified data of the file A is only written on the tape using the same method as the conventional writing method.

Figure 1:
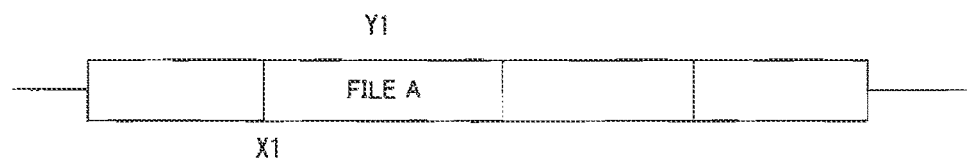
FIG. 1 is a diagram showing a configuration example of a conventional method of editing a file (updating data) by fragmentation in LTFS.
Figure 1:
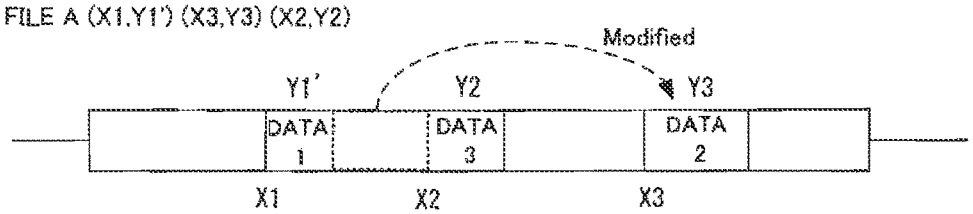
Figure 2:
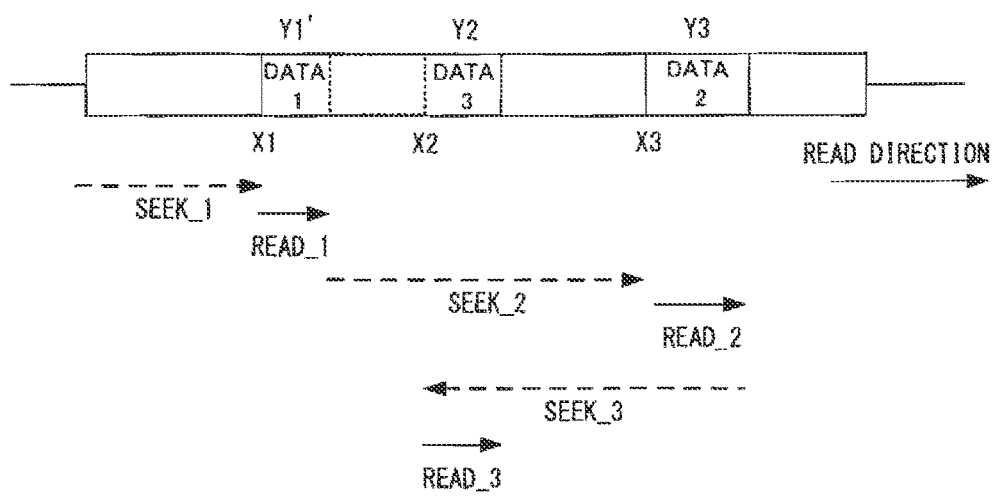
FIG. 2 is a diagram showing a configuration example of a conventional method of reading data on a tape using a file system.
Figure 6:
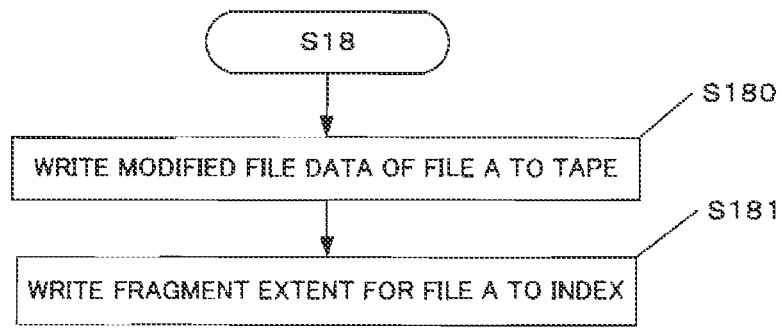
FIG. 6 is a chart showing a flow of a method of one embodiment of the present invention.

FIG. 6 shows a flow of one embodiment of the writing step S18 of the present invention. In step S180 of FIG. 6, the modified data of the file A is only written on the tape by TD 30 for example as shown in FIG. 1(*b*). The edited file A has fragment extent such as the fragment extent (X1, Y1') (X3, Y3) (X2, Y2) shown in FIG. 1(*b*), for example. In the specification, the term "extent" is used the same meaning as "extent information", "index" or "index information". In step S181, TD 30 writes the fragment extent for the edited file A to the tape (for example, data partition).

Returning to FIG. 5, if the judgment result of step S12 is Yes, in the next step S13, LTFS obtains Excessive capacity (Cx) from TD 30. In step S14, LTFS calculates a difference of lost capacity (ΔCl). ΔCl is calculated by the following equation (1), for example.

$$\Delta Cl = C2 - C1 \quad (1)$$

where C1 means a consumption tape capacity in the case of writing only the edited data part of the file on the tape, and C2 means a consumption tape capacity in the case of writing the combination data with non-editing data part and the edited data part of the file on the tape. The combination data of the file A is written as a file A having one extent. The content of writing the combination data is described further in step S16 of FIG. 5.

Figure 8:
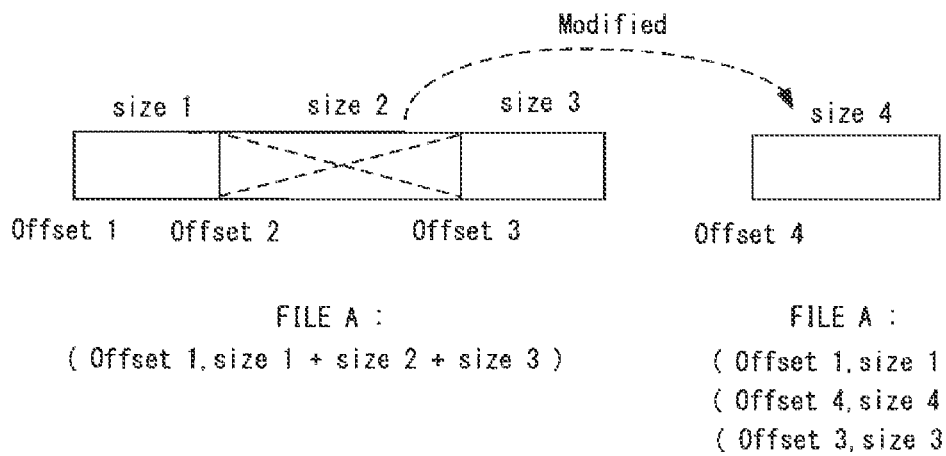
FIG. 8 is an example of an edited file and associated extent information on the memory (cache)

FIG. 8 is an example of an edited file and associated extent information on the memory (cache). If the calculation of ΔCl is explained using FIG. 8, ΔCl is calculated as follows.

C1 = the size in the case of writing with fragmented sections (size 1 + size 2 + size 3 + size 4)

C2 = the size in the case of re-writing as one file (size 1 + size 2 + size 3 + size 1 + size 4 + size 3)

ΔCl = C2 − C1 = size 1 + size 3

In step S15 of FIG. 5, LTFS judges the excessive capacity Cx is larger than the lost capacity ΔCl or not. If the judgment result is No, that is, the excessive capacity Cx is smaller than the lost capacity ΔCl, in step S18, the modified data of the file A is only written on the tape as described above. If the judgment result is Yes, that is, the excessive capacity Cx is larger than the lost capacity ΔCl, in step S16, LTFS let TD 30 write whole file data as single extent to the tape. In step S17, LTFS notifies the lost capacity ΔCl to TD 30. TD 30 stores the received ΔCl in the cartridge memory (CM) embedded in the tape cartridge, for example, with the process terminating thereafter.

Figure 7:
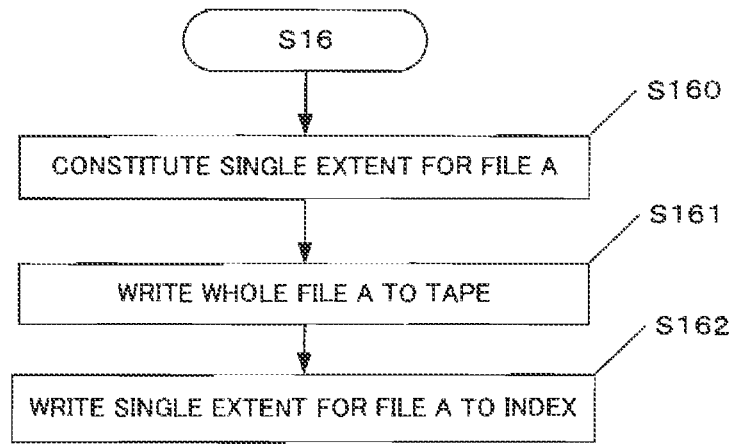
FIG. 7 is a chart showing a flow of a method of one embodiment of the present invention.

FIG. 7 shows a flow of one embodiment of the writing step S16 of the present invention. In step S160 of FIG. 7, the extent information is configured such that it constitutes one file along with the data on the cache as shown in FIG. 8. In step S161, TD 30 writes the entire edited data of the file to the tape. In step S162, TD 30 records the index to the tape such that it indicates that one file is constituted of single extent.

Figure 9:
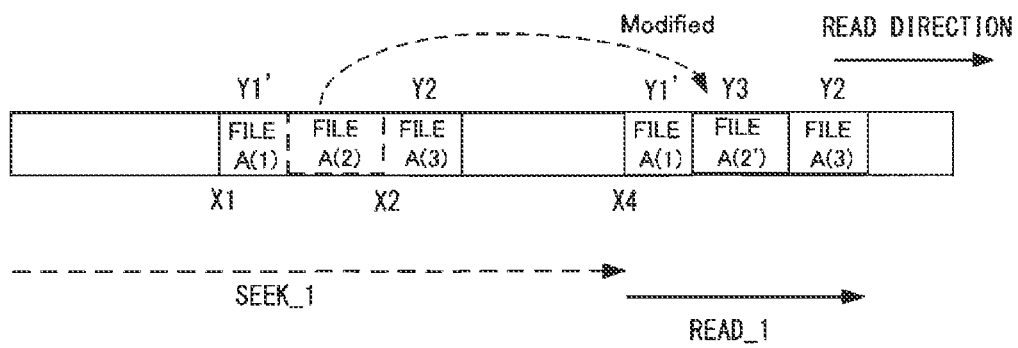
FIG. 9 is a diagram showing a configuration example of the tape image in which a file was written by the method of one embodiment of the present invention.

FIG. 9 is a diagram showing a configuration example of the tape image in which an edited file A was written in step S16 of FIG. 7. In FIG. 9, the data A (1) having the size Y1' and written starting from the offset X4, the modified data A (2') having the size Y3 and written starting from the end of the data A (1), and the data A (3) having the size Y2 and written starting from the end of the data A (2') constitute edited file A. The edited file A has a combination (continuous) data A (1) A (2') A (3) and becomes to have an extent (X4, Y1'+Y3+Y2) corresponding to the combination data. In FIG. 9, when the edited file A read out, a seek time (seek_1) for seeking the combination data position (X4) only occurs, which reduces the time (seek time) required for reading file A without reducing the total amount of file data that can be written in one tape.

<Embodiment 2>

Referring to FIG. 5 again, step S16 of writing combination data of the file can be performed when the number of times of updating the file which received the update request becomes more than the predetermined number. The predetermined number is, for example, five.

<Embodiment 3>

In step S16 of writing combination data of the file can be performed when the number of the extent after updating the file which received the update request becomes more than the predetermined number. The predetermined number is, for example, three or five.

<Embodiment 4>

In step S13, the excessive capacity Cx can be set as an acceptable capacity Ca which is the predefined acceptable lost capacity as described above. TD 30 allows reducing the actual writable capacity down to this level by replacing the excessive capacity Cx with the acceptable capacity Ca.

To perform step S13 of FIG. 5, an interface is provided for notification of the excessive capacity Cx reserved as the margin of the tape. The excessive capacity Cx when all of the data are written is calculated on the basis of the information such as the tape drive's write performance calculated based on the capacity of the data that has been written and the position on the tape. The tape drive's write performance Prw is defined as an average of proportion of the area used in re-writing in a tape. For example, if a tape of 10 m in length is usually necessary for writing of data having a certain size but actual tape length that has been used for writing is 11 m, then Prw=11/10=1.10. The range of Prw is usually equal or larger than 1.00.

When the tape drive's write performance Prw is taken into consideration, the excessive capacity Cx can be calculated as follows.

$$Cx = Cn + Cm - Prw \times Cn - Cl \quad (2)$$
$$= Cm - Cn(Prw - 1) - Cl$$

In equation (2), the second term is the used capacity due to the write performance of the drive. The third term is the lost capacity according to this scheme.

An interface is provided for updating of the lost capacity Cl used by LTFS. Notification of ΔCl is made by LTFS every time this scheme occurs. Updated lost capacity Cl is stored in the CM. The saved lost capacity Cl is read when the tape is loaded in TD 30. Another implementation is to manage the lost capacity Cl by LTFS and the lost capacity Cl is stored in the index of LTFS as an extended attribute. In this case, the LTFS reads the saved lost capacity Cl when the tape is mounted to LTFS and notifies the lost capacity Cl to TD 30.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The embodiment of the present invention has been described with reference to the accompanying drawings. However, the present invention is not limited to the embodiment. The present invention can be carried out in forms to which various improvements, corrections, and modifications are added based on the knowledge of those skilled in the art without departing from the purpose of the present invention.

The invention claimed is:

1. A method, in a data processing system, of updating data of a file on a tape in a file system using a tape drive, comprising the steps of:

responsive to receiving an update request for the file on the tape, reading data of the file from the tape on the tape drive and storing the data in a memory;

editing at least a part of the data of the file and storing the edited data part of the file in the memory;

writing a combination data of the file, including a non-edited data part of the file and the edited data part of the file, on the tape in the tape drive; and writing an extent of the combination data of the file on the tape, wherein the extent identifies an offset and a size associated with each part of the combination data.

2. The method according to claim 1, wherein writing the combination data on the tape further comprises:

obtaining an excessive capacity $Cx$ from the tape drive;

calculating a delta lost capacity $\Delta Cl$; and responsive to the excessive capacity $Cx$ being larger than the delta lost capacity $\Delta Cl$, writing the combination data of the file on the tape.

3. The method according to claim 2, wherein calculating the delta lost capacity ΔCl further comprises:
calculating ΔCl=C2−C1, where C1 means a consumption of tape capacity that would be used in writing only the edited data part of the file-on the tape, and C2 means a consumption of tape capacity that would be used in writing the combination data of the file on the tape.

4. The method according to claim 2, further comprising:
calculating Cx=Cm−Cl, where Cm means a tape capacity of a margin region that is preset at the rear end part of the tape, and Cl means a lost capacity of the tape.

5. The method according to claim 2, further comprising:
setting the excessive capacity Cx as an acceptable capacity Ca.

6. The method according to claim 1, wherein writing the combination data of the file is performed when a number of times of writing fragmented parts of the file to the tape becomes more than a predetermined number.

7. The method according to claim 1, wherein writing the combination data of the file is performed when a number of times of writing extents associated with fragmented parts of the file to on the tape becomes more than a predetermined number.

8. The method according to claim 2, further comprising:
notifying the delta lost capacity ΔCl to the tape drive.

9. The method according to claim 1, further comprising:
writing only the edited data part of the file on the tape instead of writing the combination data of the file on the tape if the excessive capacity Cx is smaller than the delta lost capacity ΔCl.

10. A storage system for managing files using a file system comprising:
a host comprising:
a processor; and
a memory coupled to the processor; and
at least one tape drive which is able to communicate with the host, wherein the memory comprises instructions which, when executed by the processor, cause the processor to:
responsive to receiving an update request for a file on a tape, read data of the file from the tape on the tape drive and storing the data in a memory;
edit at least a part of the data of the file and storing the edited data part of the file in the memory;
write a combination data of the file, including a non-edited data part of the file and the edited data part of the file, on the tape in the tape drive; and
write an extent of the combination data of the file on the tape, wherein the extent identifies an offset and a size associated with each part of the combination data.

11. The storage system according to claim 10, wherein the instructions for writing the combination data of the file on the tape further cause the processor to:
obtain an excessive capacity Cx from the tape drive;
calculate a delta lost capacity ΔCl; and
responsive to the excessive capacity Cx being larger than the delta lost capacity ΔCl, write the combination data of the file on the tape.

12. The storage system according to claim 11, wherein the instructions for calculating the delta lost capacity ΔCl further cause the processor to:
calculate ΔCl=C2−C1, where C1 means a consumption of tape capacity that would be used in writing only the edited data part of the file-on the tape, and C2 means a consumption of tape capacity that would be used in writing the combination data of the file on the tape.

13. The storage system according to claim 11, wherein the instructions further cause the processor to:
calculate Cx=Cm−Cl, where Cm means a tape capacity of a margin region that is preset at the rear end part of the tape, and Cl means a lost capacity of the tape.

14. The storage system according to claim 11, wherein the instructions further cause the processor to:
set an acceptable capacity Ca as the excessive capacity Cx.

15. The storage system according to claim 10, wherein the combination data of the file is written when a number of times of writing fragmented parts of the file to the tape becomes more than a predetermined number.

16. The storage system according to claim 10, wherein the combination data of the file is written when a number of times of writing extents associated with fragmented parts of the file to on the tape becomes more than a predetermined number.

17. The storage system according to claim 11, wherein the instructions further cause the processor to:
notify the delta lost capacity ΔCl to the tape drive.

18. The storage system according to claim 10, wherein the instructions further cause the processor to:
write only the edited data part of the file on the tape instead of writing the combination data of the file on the tape if the excessive capacity Cx is smaller than the delta lost capacity ΔCl.

19. A computer program product for managing files in a file system using at least one tape drive, the computer program product comprising a computer readable storage medium having a computer readable program stored therein, wherein the computer readable program, when executed on a computing device, causes the computing device to:
responsive to receiving an update request for a file on a tape, read data of the file from the tape on a tape drive and storing the data in a memory;
edit at least a part of the data of the file and storing the edited data part of the file in the memory;
write a combination data of the file, including a non-edited data part of the file and the edited data part of the file, on the tape in the tape drive; and
write an extent of the combination data of the file on the tape, wherein the extent identifies an offset and a size associated with each part of the combination data.

20. The computer program product according to claim 19, wherein the computer readable program for writing the combination data of the file on the tape further causes the computing device to:
obtain an excessive capacity Cx from the tape drive;
calculate a delta lost capacity ΔCl; and
responsive to the excessive capacity Cx being larger than the delta lost capacity ΔCl, write the combination data of the file on the tape.

* * * * *